United States Patent [19]

Ito et al.

[11] Patent Number: 5,224,354
[45] Date of Patent: Jul. 6, 1993

[54] CONTROL SYSTEM FOR REFRIGERATING APPARATUS

[75] Inventors: Takeshi Ito; Tomio Yoshikawa, both of Shimizu, Japan

[73] Assignee: Hitachi, Ltd., Tokyo, Japan

[21] Appl. No.: 962,841

[22] Filed: Oct. 19, 1992

[30] Foreign Application Priority Data

Oct. 18, 1991 [JP] Japan .................. 3-271173

[51] Int. Cl.$^5$ .............................. F25B 41/04
[52] U.S. Cl. .................... 62/210; 62/196.3; 62/222
[58] Field of Search .............. 62/208, 209, 210, 211, 62/212, 213, 222, 223, 224, 225, 204, 205, 206, 201, 196.1, 196.3

[56] References Cited

U.S. PATENT DOCUMENTS

| | | | |
|---|---|---|---|
| 4,261,180 | 4/1981 | Nozawa et al. | 62/222 |
| 4,441,331 | 4/1984 | Yuyama | 62/196.3 |
| 4,620,424 | 11/1986 | Tanaka et al. | 62/222 |
| 4,910,968 | 3/1990 | Yamashita et al. | 62/204 |

*Primary Examiner*—Harry B. Tanner
*Attorney, Agent, or Firm*—Antonelli, Terry, Stout & Kraus

[57] ABSTRACT

There is disclosed a control system for controlling a refrigerating apparatus in which a control unit is arranged to calculate a super heat amount of a discharge gas of a compressor at the time immediately before starting operation of the compressor, on the basis of a difference between temperatures detected by a discharge gas temperature sensor and a condenser temperature sensor and to control an opening degree of an electronic expansion valve to a completely open state. After starting operation of the compressor, the control unit constantly measures the super heat amount of the discharge gas and controls the valve opening degree to the usual degree when the super heat amount becomes higher than the preset value.

3 Claims, 4 Drawing Sheets

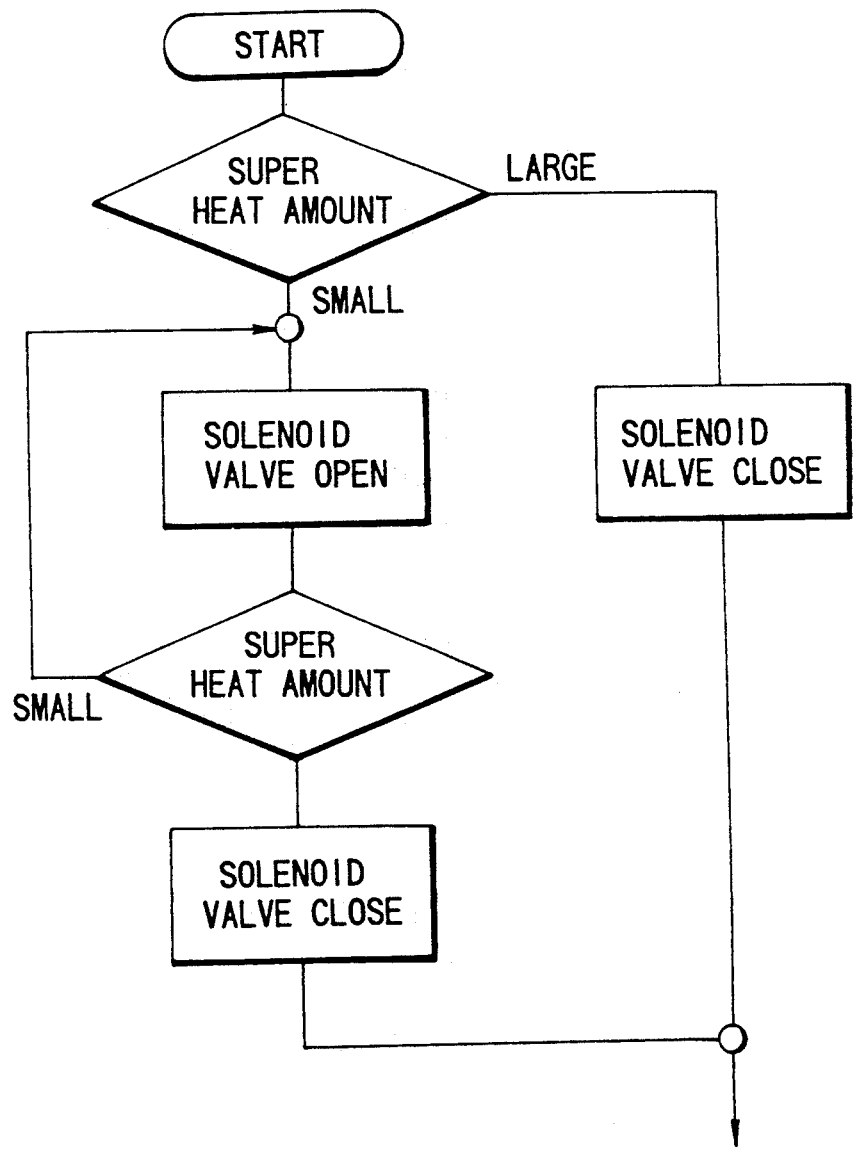

CONTROL SYSTEM FOR REFRIGERATING APPARATUS

BACKGROUND OF THE INVENTION

1. Field of the Invention

The present invention relates to a control system for controlling a refrigerating apparatus which has a refrigeration cycle including a refrigerant compressor of capacity controllable type, a condenser, an expansion valve of opening degree controllable type and an evaporator.

2. Description of the Prior Art

Japanese Patent Application Laid-Open No. Hei 2-27525 discloses a control system for controlling a refrigerating apparatus for cooling a LSI chip in a computer by passing a fluid cooled by the refrigerating apparatus through said LSI chip by means of a fluid circulating pump, which comprises measuring an average temperature of said fluid, after starting the fluid circulating pump, comparing the measured average temperature with a preset value, controlling a starting time of operation of the LSI chip and a starting time of operation of the refrigerating apparatus on the basis of a result of the comparison of said average temperature with the preset value so that the fluid temperature after starting of operation of the system may rapidly arrive at the preset value and then non-stepwisely varying a refrigerating capacity of the refrigerating apparatus on the basis of intermittently measured fluid temperature, thereby precisely controlling temperature conditions so that the LSI chip operates in steady state.

The control system according to the prior art as described above has such defect that a state of the refrigerating cycle immediately before starting said cycle is not taken into account in the case where the refrigerating cycle is started from a state where the refrigerating system has been held stopped for a long time. In other words, the refrigerating system according to the prior art as described above is so constructed that detection is made on a compressor discharge gas temperature and a condensation temperature of the refrigerating cycle and a temperature of a cooling fluid (water cooled by an evaporator) and the refrigerating cycle is operated on the basis of such detected temperatures, but no detection is made on a state of the refrigerating cycle immediately before starting said cycle so that such state is not taken into account at the time of starting the operation.

OBJECT OF THE INVENTION

It is an object of the present invention to provide a control system for a refrigerating apparatus in which detection is made on the state of the refrigerating cycle immediately before starting the compressor included in the refrigerating cycle and a result of such detection is taken into account, whereby a time required for the refrigerating cycle to arrive at its steady state can be reduced and an operating efficiency of the refrigerating cycle can be promoted.

SUMMARY OF THE INVENTION

With the object as described above, the present invention provides a control system as hereinafter described.

In accordance with an aspect of the present invention, there is provided a control system for a refrigerating apparatus having a refrigerating cycle including a compressor of capacity controllable type, a condenser, an expansion valve of opening degree controllable type, an evaporator and a refrigerant feeding pipe connecting the above components, which comprises a control unit for measuring a super heat amount of a discharge gas from the compressor at the time immediately before starting the compressor and at the succeeding time, said control unit being so arranged that in the case where said super heat amount measured immediately before starting the compressor is higher than a preset value, an opening degree of the valve at the compressor starting time and the succeeding time is controlled to a degree at the time of normal operation, and in case where said super heat amount measured immediately before starting the compressor is lower than the preset value, said expansion valve is controlled to a large opening degree larger than that of the normal operation and when the super heat amount measured after starting the compressor becomes higher than the preset value, the valve opening degree is changed over to the opening degree in the normal operation.

In accordance with another aspect of the present invention there is provided a control system for a refrigerating apparatus of the above kind, which comprises a hot gas bypass circuit connecting a discharge side and a suction side of the compressor and including a solenoid valve therein, said hot gas bypass circuit being so arranged that in the case where said super heat amount measured immediately before starting the compressor is higher than the preset value, said solenoid valve is closed at the compressor starting time and the succeeding time and in the case where said super heat amount measured immediately before starting the compressor is lower than the preset value, said solenoid valve is opened to a larger degree at the time of starting the compressor and when the super heat amount measured after starting the compressor becomes larger than the preset valve, the solenoid valve is changed to its closed state.

In accordance with another aspect of the present invention there is provided a control system for a refrigerating apparatus of the above kind, in which a temperature sensor for sensing a gas temperature at the discharge side of the compressor and a temperature sensor for sensing a condenser temperature are included, and said control unit is arranged to measure the super heat amount from a difference between the temperatures measured by said temperature sensors.

The control system for refrigerating apparatus according to the present invention operates, as described below. In the case where the super heat amount of the discharge gas of the compressor measured immediately before starting the compressor is higher than the preset value, the opening degree of the expansion valve is controlled to the degree for the normal operation, and then the operation of the compressor is started. On the other hand, in the case where the super heat amount of the discharge gas of the compressor measured immediately before starting the compressor is lower than the preset value, the opening degree of the expansion valve is controlled to the degree larger than that for the normal operation and then the compressor is started. In the former case, the system arrives at its steady operation state under the valve opening degree for the normal operation, and in the latter case, when the super heat amount of the discharge gas of the compressor measured after starting the compressor becomes higher than the preset value, the valve opening degree of the expansion valve is changed to that for the normal operation and then the operation arrives at its steady operation state.

BRIEF DESCRIPTION OF THE DRAWINGS

FIG. 5 is a flow diagram illustrating a control for opening and closing a solenoid valve shown in FIG. 4.

DESCRIPTION OF THE PREFERRED EMBODIMENTS OF THE INVENTION

Now the description will be given to the preferred embodiments of the invention.

Figure 1:
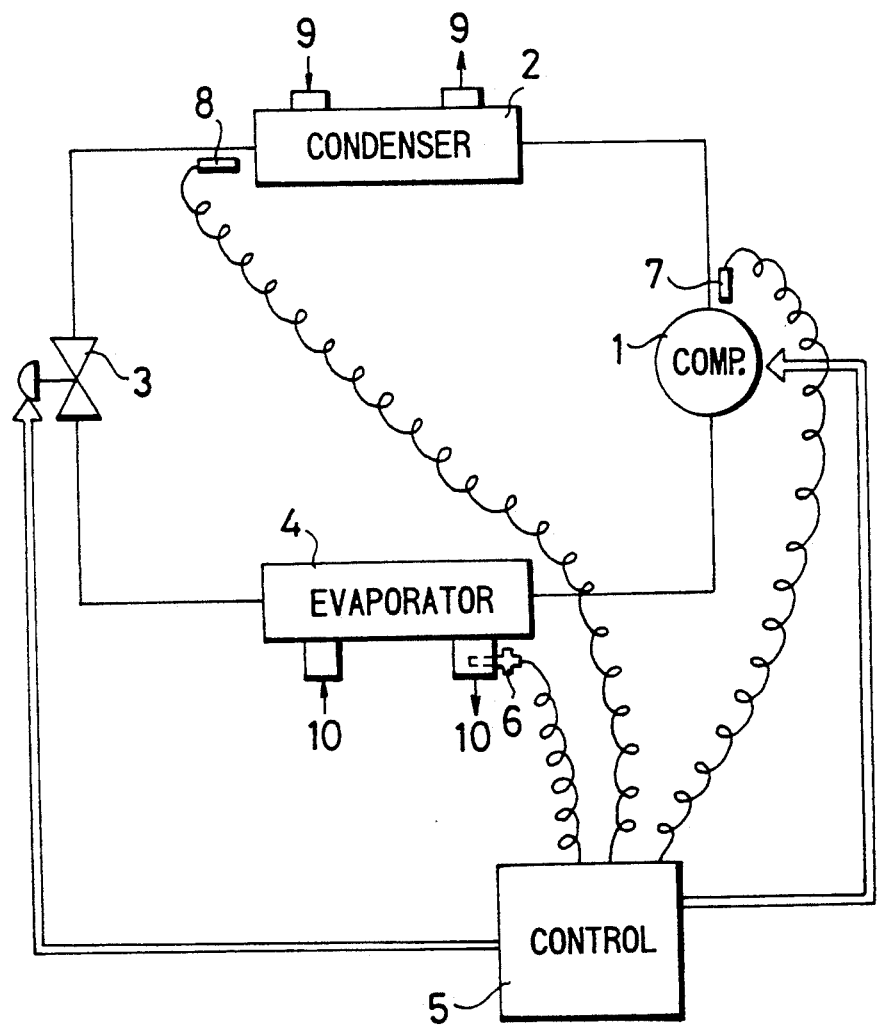
FIG. 1 illustrates a refrigerating cycle of the refrigerating apparatus according to one embodiment of the preset invention.

Firstly the description will be given to the embodiment shown in FIGS. 1 and 2. FIG. 1 illustrates a system of the refrigerating apparatus according to the embodiment of the present invention. In this system, a refrigerating cycle comprises a compressor 1 of capacity controllable type (for example, a compressor driven by an inverter having a variable frequency), a condenser 2, an electronic expansion valve 3 having a variable opening degree, an evaporator 4 and a refrigerant feeding pipe which connects the above components with each other. The refrigerating cycle is further provided with a control unit 5, a cooling water temperature sensor 6, a discharge gas temperature sensor 7 and a condenser temperature sensor 8. The condenser 2 is arranged to be cooled by heat exchanging action with a cooling water, and the evaporater 4 is arranged to cool a water 10 under the heat exchanging action with said water 10. This cooling water 10 is used to cool an object to be cooled.

Under the normal operating condition of said refrigerating apparatus, the cooling water temperature sensor 6 serves to detect the temperature of the water 10 and the control unit 5 acts to effect the capacity control of the compressor 1 (for example, the revolutional speed control of the compressor by controlling the frequency of the inverter for driving the compressor), whereby the temperature of the cooling water is maintained at a desired temperature. During such normal operation, the valve opening degree of the electronic expansion valve 3 is controlled to a degree corresponding to the capacity control of the compressor 1.

In the above-described refrigerating apparatus, after the operation of the apparatus is stopped, a super heat amount of the gas at the discharge side of the compressor gradually lowers and if the operation of the apparatus is held stopped for a long time, said super heat amount lowers beyond a preset value. The present invention aims at bringing the apparatus into its steady-state operation as soon as possible after starting operation, even if the super heat amount of the discharge gas has lowered beyond the preset value owing to stopping the apparatus for a long time. According to the embodiment of the present invention as shown in FIGS. 1 and 2, the control is effected as described below.

Before starting operation of the refrigerating apparatus, the temperature of the refrigerant contained in the outlet of the compressor is detected by the discharge gas temperature sensor 7 and the temperature of the refrigerant at the outlet of the condenser 2 is detected by the condenser temperature sensor 8. The values of the respective temperatures detected by these sensors are fed to the control unit 5. The control unit 5 serves to effect an arithmetic operation of a difference between the values fed to the control unit and to calculate a super heat amount of the discharge gas of the compressor 1 on the basis of said difference. If the super heat amount thus calculated is lower than a preset value, such judgment is made that the refrigerating cycle as a whole has been held stopped for a long time so that the refrigerant is unevenly distributed in the refrigerating system. In the case where such judgment is made, if the electronic expansion valve 3 is held at the usual valve opening degree, the pressure at the lower pressure side of refrigerating system would be excessively lowered at the time of starting operation of the compressor of the refrigerating cycle. In order to avoid such excessive lowering of the pressure at the lower pressure side, the control unit 5 acts to feed a signal to the electronic expansion valve 3 to increase the valve opening degree to a higher opening degree (for example, to a completely opened state). On the other hand, if the super heat amount of the gas at the discharge side of said compressor, which has been calculated by the control unit 5, is higher than the preset value, such judgment is made that the refrigerating cycle has been stopped for a short time. When such judgment is made, the control unit 5 acts to feed a signal to the electronic expansion valve 3 to control the valve opening degree to the usual opening degree, thereby holding the electronic expansion valve 3 at the opening degree corresponding to that controlled under the normal operating state. Then the operation of the compressor of the refrigerating apparatus is started. After starting operation, the control unit 5 continues its control operation to calculate the super heat amount of the discharge gas of the compressor on the basis of the detected temperatures of the temperature sensors 7 and 8 and to change the large opening degree of the electronic expansion valve 3 to an opening degree based on the control during the normal operating condition if the above super heat amount becomes larger than the preset value.

Figure 2:
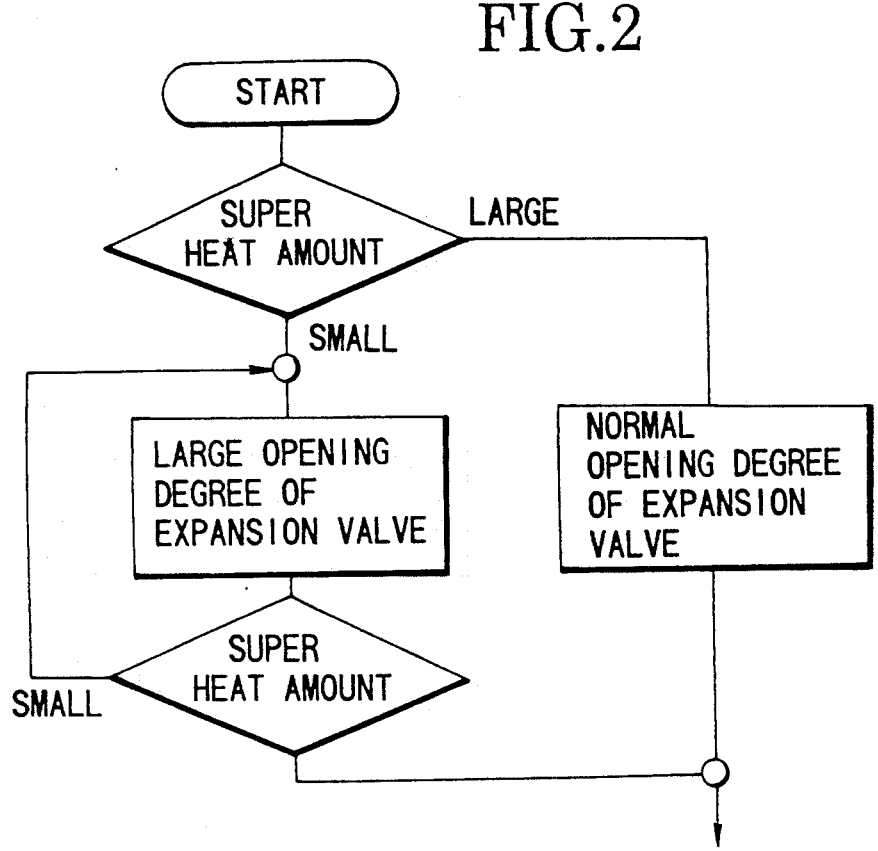
FIG. 2 is a flow chart illustrating a control system of the embodiment shown in FIG. 1.

The above control operation is illustrated in the flow chart shown in FIG. 2.

Figure 3:
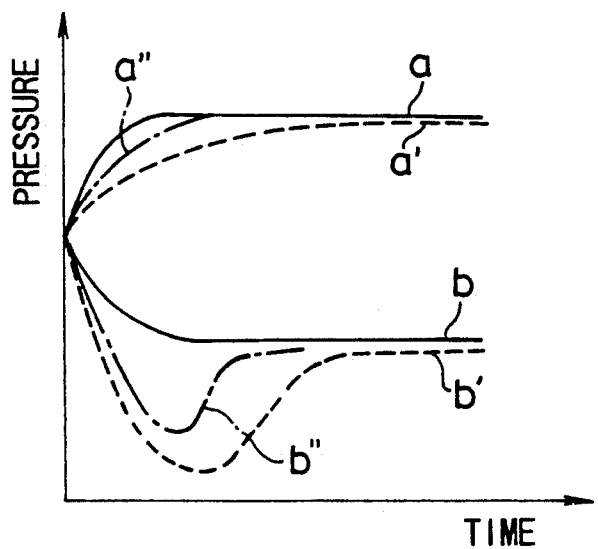
FIG. 3 is a diagram showing a change of pressure of the refrigerant at an inlet side (low pressure side) and at a discharge side (high pressure side) of a compressor after starting operation thereof.

FIG. 3 illustrates a relation between a pressure in the refrigerating cycle versus a time elapsed after starting operation of the compressor of the refrigerating apparatus. In FIG. 3, the solid lines a and b show changes of the pressure after starting operation of the refrigerating cycle, at the high pressure side and the low pressure side, respectively, in the case where the operation stopping interval before starting operation of the compressor is short and, consequently, the compressor is at a high temperature at the time immediately before starting operation of the compressor. Such changes in pressure are substantially the same in the case of the present invention and in the case of the prior art. On the other hand, in the case where the operation stopping interval immediately before starting operation is long and, consequently, the compressor is at low temperature at the time immediately before starting operation, the pressures at the high pressure side and the low pressure side of the refrigerating cycle after starting operation cause changes as indicated by the dash lines a' and b' in the case of the prior art, while such pressures cause changes as indicated by one-dot-and-dash lines a" and b" in the case of the present invention.

Figure 4:
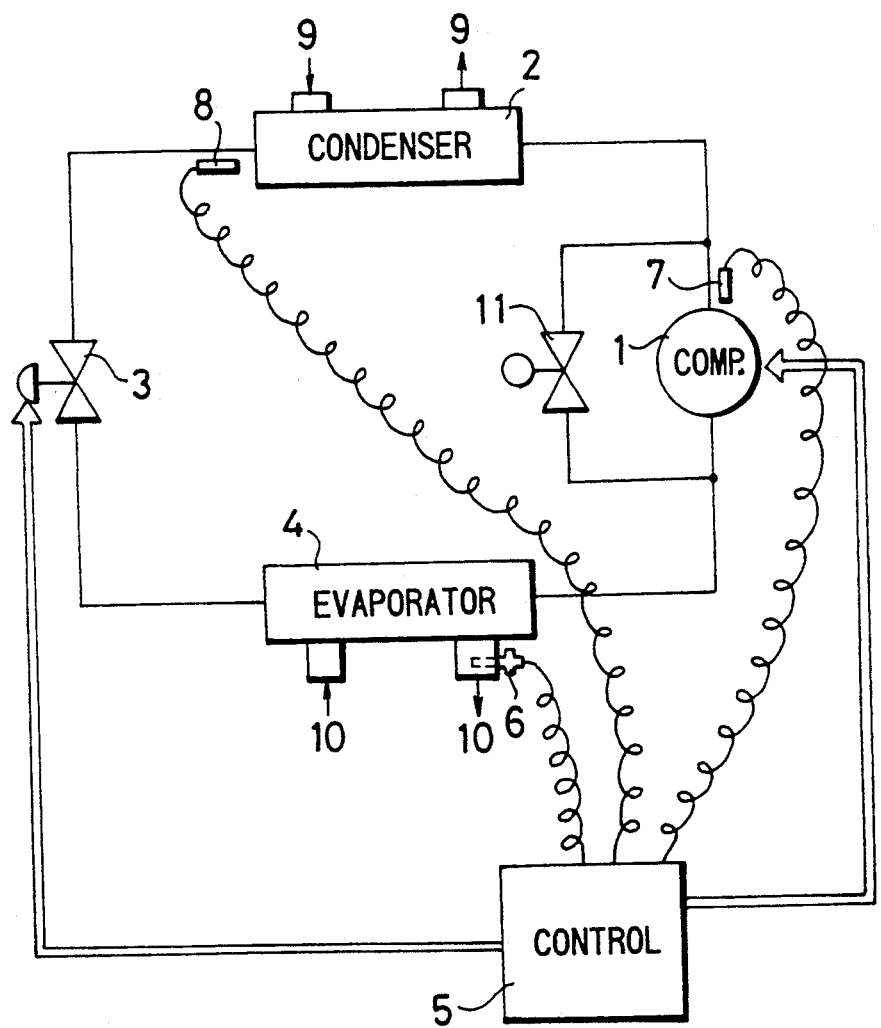
FIG. 4 illustrates a refrigerating cycle of the refrigerating apparatus according to another embodiment of the present invention.

FIG. 4 illustrates another embodiment of the present invention. This embodiment illustrates a system which is essentially the same as that shown in FIG. 1 but includes a hot gas bypass circuit which is connected between a discharge pipe and a suction pipe of the compressor 1 of the refrigerating cycle and includes a solenoid valve 11 connected therein. The other constructions and the function of this embodiment are substantially the same as those described in connection with the embodiment shown in FIG. 1 and the description thereof is omitted. In the embodiment shown in FIG. 4, the refrigerant temperature in the outlet of the compressor at the time immediately before starting operation of the compressor 1 and the refrigerant temperature at the outlet of the condenser 2 are detected by a discharge gas temperature sensor 7 and a condenser temperature sensor 8, respectively, and the values of the detected temperatures are fed to the control unit 5. The control unit 5 functions to effect an arithmetic operation of a difference between these values and to calculate a super heat amount from this difference.

The valve opening degree of the electronic expansion valve 3 is controlled, depending upon whether the above-mentioned super heat amount is higher or lower than the preset value, in the same manner as described in connection with the embodiment shown in FIG. 1. In case where the super heat amount is higher than the preset value, the solenoid valve 11 is held in closed state. In the case where the super heat amount is lower than the preset value, the solenoid valve 11 is opened and the compressor in the refrigerating cycle is started. Then, the solenoid valve 11 is closed when the super heat amount of the compressor discharge gas becomes higher than the preset valve.

FIG. 5 is a flow chart showing the control of the opening degree of the solenoid valve 11. The flow chart concerning the control of the opening degree of the electronic valve 3 is same as shown in FIG. 2. According to this embodiment, a transient state of the refrigerating cycle after starting operation of the compressor can be rapidly and effectively brought into the steady-state.

In the embodiments as described above, the explanation as given to the case in which the super heat amount of the discharge gas of the compressor is calculated from the difference between the detected temperatures of the discharge gas temperature sensor 7 and the condenser temperature sensor 8. However, said super heat amount of the discharge gas may be calculated on the basis of a pressure detected by a pressure sensor, namely a discharge gas pressure sensor or a condenser pressure sensor, which is provided for this purpose.

According to the present invention, the super heat amount of the compressor discharge gas at the time immediately before starting operation of the compressor is detected and then the control of the refrigerating cycle after starting operation of the compressor is effected on the basis of a result of the detection. Accordingly, even if an excessive lowering of a pressure before starting operation occurs owing to stopping of the compressor for a long time, the compressor is rapidly brought into its steady-state operation after starting operation of the compressor. After starting operation, the super heat amount of the discharge gas is constantly calculated and the valve opening degree of the expansion valve is changed, depending upon whether the super heat amount thus calculated is higher or lower than the preset value, so that the refrigerating cycle is prevented from being subjected to an abnormal load which may be produced for example when the refrigerating cycle is held in a transient state after starting. In the refrigerating cycle in which the hot gas bypass circuit is included and it acts to open or close the valve in response to the discharge gas super heat amounts at the time immediately before starting operation and after starting operation, the time required for the refrigerating cycle to come its steady state after starting operation can be further reduced by bringing said hot gas bypass circuit into its effective state when the discharge gas is at a lower temperature.

What is claimed:

1. A control system for controlling a refrigerating apparatus including a compressor of capacity controllable type, a condenser, an expansion valve having a controllable opening degree, an evaporator and a refrigerant feeding pipe which connects the above components with each other, said control system comprising:

a control unit for measuring a super heat amount of a discharge gas of the compressor at the time immediately before starting operation and after starting operation of the compressor and for controlling an opening degree of the expansion valve in such a manner that in the case where said super heat amount measured immediately before starting operation of the compressor is higher than a preset value, the opening degree of said expansion valve at the time of starting operation of the compressor and at the succeeding time is controlled to a degree for usual operation, and in the case where said super heat amount measured immediately before starting operation of the compressor is lower than the preset value, the opening degree of said expansion valve is increased to a large opening degree larger than that for the usual operation at the time of starting operation of the compressor and then changed over to the opening degree for the usual operation when the super heat amount measured after starting operation of the compressor becomes higher than the preset value.

2. A control system according to claim 1, in which a hot gas bypass circuit including a solenoid valve connected therein is connected between a discharge side and a suction side of the compressor, and said control unit is arranged to close said solenoid valve at the time of starting operation of the compressor and the succeeding time when the super heat amount measured immediately before starting operation of the compressor is higher than the preset value, and to open said solenoid valve at the time of starting operation of the compressor when the super heat amount measured immediately before starting operation of the compressor is lower than the preset value and to change over said solenoid valve to its closed state when the super heat amount measured after starting operation of the compressor becomes higher than the preset value.

3. A control system according to claim 1 or 2, which includes a compressor discharge gas temperature sensor and a condenser temperature sensor, in which said control unit is arranged to calculate the super heat amount from a difference between temperatures detected by said sensors.

* * * * *